United States Patent
Husain et al.

(10) Patent No.: US 11,127,414 B2
(45) Date of Patent: Sep. 21, 2021

(54) SYSTEM AND METHOD FOR REDUCING DISTORTION AND ECHO LEAKAGE IN HANDS-FREE COMMUNICATION

(71) Applicant: 2236008 Ontario Inc., Waterloo (CA)

(72) Inventors: Mohammad Aamir Husain, Surrey (CA); Michael Andrew Percy, North Vancouver (CA); Mark Robert Every, Surrey (CA); Frank Linseisen, North Vancouver (CA)

(73) Assignee: BlackBerry Limited, Waterloo (CA)

( * ) Notice: Subject to any disclaimer, the term of this patent is extended or adjusted under 35 U.S.C. 154(b) by 167 days.

(21) Appl. No.: 16/505,933

(22) Filed: Jul. 9, 2019

(65) Prior Publication Data
US 2021/0012789 A1   Jan. 14, 2021

(51) Int. Cl.
| | |
|---|---|
| *H03G 9/02* | (2006.01) |
| *G10L 21/0232* | (2013.01) |
| *G10L 21/0208* | (2013.01) |
| *H04M 9/08* | (2006.01) |
| *G10L 21/0264* | (2013.01) |
| *H04R 3/04* | (2006.01) |
| *G10L 21/0216* | (2013.01) |

(52) U.S. Cl.
CPC ...... *G10L 21/0264* (2013.01); *G10L 21/0232* (2013.01); *H04R 3/04* (2013.01); *G10L 2021/02082* (2013.01); *G10L 2021/02163* (2013.01); *H04R 2430/01* (2013.01)

(58) Field of Classification Search
CPC ............ G10L 21/0264; G10L 21/0232; G10L 2021/02082; G10L 2021/02163; G10L 21/0208; H04R 3/04; H04R 2430/01; G10K 11/16; H04M 9/082

USPC ........................................................ 381/71.1
See application file for complete search history.

(56) References Cited

U.S. PATENT DOCUMENTS

| | | | |
|---|---|---|---|
| 2002/0181698 A1 | 12/2002 | Takahashi et al. | |
| 2014/0334631 A1* | 11/2014 | de Vicente Pena ... | H04M 9/082 381/71.1 |

(Continued)

FOREIGN PATENT DOCUMENTS

| | | | | |
|---|---|---|---|---|
| CN | 109862200 A | * | 6/2019 | ......... G10L 21/0208 |

OTHER PUBLICATIONS

EPO: Extended European Search Report relating to EP application No. 20175880.2, dated Sep. 18, 2020.

*Primary Examiner* — Vivian C Chin
*Assistant Examiner* — Ubachukwu A Odunukwe
(74) *Attorney, Agent, or Firm* — Rowand LLP (57) ABSTRACT

A method of echo cancellation in hands-free communication is disclosed. The method includes: receiving, via a receive signal processor, a far-end audio signal; providing the far-end audio signal to: an acoustic echo canceller module as a reference signal, and at least one loudspeaker for playback; determining an external gain value associated with the far-end audio signal, the external gain applied to the far-end audio signal downstream of the receive signal processor and prior to playback from the at least one loudspeaker; adjusting at least one parameter of the acoustic echo canceller module based on the external gain value; receiving playback output of the far-end audio signal from the at least one loudspeaker as an input signal to a microphone; and processing the microphone input signal by the adjusted acoustic echo canceller module to produce an echo-cancelled signal.

16 Claims, 6 Drawing Sheets

(56) References Cited

U.S. PATENT DOCUMENTS

2015/0010168 A1* 1/2015 Cheng .................... H03G 9/025
                                                      381/107
2019/0165832 A1   5/2019 Khaduri et al.

* cited by examiner

SYSTEM AND METHOD FOR REDUCING DISTORTION AND ECHO LEAKAGE IN HANDS-FREE COMMUNICATION

TECHNICAL FIELD

The present disclosure relates to audio signal processing and, in particular, to systems and methods for reducing distortion and echo leakage in hands-free communication.

BACKGROUND

In hands-free communication, such as a hands-free phone call inside a vehicle, an acoustic echo cancellation solution may be employed to cancel or reduce the echo of a far-end audio signal. One source of complication for echo cancellation is distortion which may be introduced at the audio playback stage. Specifically, non-linear distortion rendered by a loudspeaker can lead to faulty or partial cancellation of the echo, and poor voice quality of downlink speech at audio playback.

It is desirable to provide techniques for improving echo cancellation and reducing loudspeaker distortion in a hands-free communication system.

BRIEF DESCRIPTION OF DRAWINGS

Reference will now be made, by way of example, to the accompanying drawings which show example embodiments of the present application and in which.

Like reference numerals are used in the drawings to denote like elements and features.

DETAILED DESCRIPTION OF EXAMPLE EMBODIMENTS

In one aspect, the present disclosure describes a method of reducing playback distortion of a downlink signal and improving echo cancellation in hands-free communication. The method includes: receiving, via a receive signal processor, a far-end audio signal; providing the far-end audio signal to: an acoustic echo canceller module as a reference signal, and at least one loudspeaker for playback; determining an external gain value associated with the far-end audio signal, the external gain applied to the far-end audio signal downstream of the receive signal processor and prior to playback from the at least one loudspeaker; adjusting at least one parameter of the acoustic echo canceller module based on the external gain value; receiving an input signal to a microphone containing acoustic echo of the far-end audio signal played from the at least one loudspeaker; and processing the microphone input signal by the adjusted acoustic echo canceller module to produce an echo-cancelled signal.

In some implementations, determining the external gain value may comprise determining a current external playback volume associated with the at least one loudspeaker.

In some implementations, the method may further comprise: performing, by the receive signal processor, a non-linear compression of the far-end audio signal prior to playback from the at least one loudspeaker; and adjusting at least one parameter associated with the non-linear compression based on the current external playback volume.

In some implementations, the non-linear compression of the far-end audio signal may comprise multiband limiting of the far-end audio signal.

In some implementations, performing the multiband limiting may comprise dividing a frequency spectrum of the far-end audio signal into a plurality of frequency bands and performing limiting on each frequency band individually, and adjusting the at least one parameter associated with the multiband limiter may comprise adjusting a limiter threshold for at least one of the plurality of frequency bands, the limiter threshold being associated with a predetermined tuning volume.

In some implementations, a change in a compression threshold for the at least one frequency band may be proportional to a change in volume from the tuning volume to the current external playback volume.

In some implementations, adjusting the at least one parameter of the acoustic echo canceller module may comprise adjusting an estimated echo return loss (ERL), an adaptive filter step-size, and/or a filter coefficient estimating the echo path.

In some implementations, determining the external gain value may comprise obtaining an estimate for the magnitude of the external gain based on the microphone input signal and far-end reference signal.

In some implementations, obtaining the estimate for the magnitude of the external gain may comprise obtaining an acoustic coupling factor representing a ratio of a power spectrum of the microphone to a power spectrum of the far-end reference signal.

In some implementations, the method may further comprise: determining that playback distortion of the at least one loudspeaker is likely based on the acoustic coupling factor; and in response to determining that playback distortion of the at least one loudspeaker is likely, performing, by the receive signal processor, a non-linear compression of the far-end audio signal.

In another aspect, the present disclosure describes a system for cancelling echo in hands-free communication. The system includes a loudspeaker, a microphone containing echo of the playback output from the loudspeaker, and a processor. The processor is configured to: receive a far-end audio signal; provide the far-end audio signal to: an acoustic echo canceller module as a reference signal, and the loudspeaker for playback; determine an external gain value associated with the far-end audio signal, the external gain applied to the far-end audio signal downstream of the receive signal processor and prior to playback from the at least one loudspeaker; adjust at least one parameter of the acoustic echo canceller module based on the external gain value; receive an input signal to a microphone containing acoustic echo of the far-end audio signal played from the at least one loudspeaker; and process the microphone input signal by the adjusted acoustic echo canceller module to produce an echo-cancelled signal.

In yet another aspect, the present disclosure describes a method for tuning a non-linear compressor that minimizes loudspeaker distortion. The method includes: receiving, via a receive signal processor, a far-end audio signal; determining an external gain value associated with the far-end audio signal, the external gain applied to the far-end audio signal downstream of the signal processing via the non-linear compressor and prior to playback from the loudspeaker; adjusting at least one parameter of the non-linear compressor based on the external gain value; and processing, via the receive signal processor, the far-end audio signal using adjusted at least one parameter of the non-linear compressor.

Other example embodiments of the present disclosure will be apparent to those of ordinary skill in the art from a review of the following detailed descriptions in conjunction with the drawings.

In an acoustic echo cancellation system, the echo canceller is provided a reference signal which contains audio that will be played into the near-end acoustic environment. The echo canceller uses the reference signal to cancel out the echo introduced by this audio in an input to a microphone. For example, during a hands-free telephone call, the audio from the far-end of the call is fed into the echo canceller as a reference signal, before it is provided to the loudspeaker for playback. A microphone in the acoustic environment picks up, as input, both the near-end (i.e. local) speech signal and the echo of the playback signal of the far-end audio. The echo canceller then uses the reference signal to estimate and subtract the echo from the microphone input signal before sending it to a communication network for transmission to the far-end caller.

If the estimated echo obtained by filtering the reference signal does not match the echo measured at the microphone, then the echo may not be cancelled properly. One common source of variation between the estimated echo obtained from the reference signal and the actual echo is distortion which may be introduced at the playback stage. This is commonly present when the audio is played back at a loud volume as the speakers and other audio components are unable to reproduce the sound with sufficient power and accuracy.

If distortion is introduced, it can often take the form of audio energy being added to the signal picked up at the microphone at frequencies other than where energy was present in the original reference signal. When that audio signal is compared with the estimated echo obtained from the reference signal, it appears that there is audio present other than the reference signal. The echo canceller would not be able to cancel out this audio, as non-linear distortion rendered by a loudspeaker can violate an echo canceller's linear assumption and result in echo leakage, i.e. only partial cancellation of the echo, with some echo components being leaked through to a listener, for example, on the far-end of a hands-free telephone call.

Further, if the reference signal used by the echo canceller does not match the changes in volume level applied by a subsequent gain downstream of the receive signal processing and hence picked up at the microphone, the echo canceller may take longer time, or even fail, to adapt to such changes, leading to some parts of the signal not being cancelled as they should be and objectionable echo leaking through to the far-end of the call.

Generally, loudspeaker distortion tends to increase when the signal driving the loudspeaker increases in level, and there is normally a range within which the behavior of the loudspeaker is roughly linear and hence echo leakage is not introduced by a functional linear echo canceller as it cancels the echo picked up at the microphone. The reference signal may subsequently be amplified by a variable gain downstream of the receive signal processing, before being played out through a loudspeaker. For example, the variable gain may be implemented on an amplifier which is downstream of the infotainment head-unit where the hands-free processing is applied. This gain is defined to be an external receive gain, as it is a gain that is applied to the receive signal and is external to the routine processing of the receive signal. A high level of receive external volume may cause the loudspeaker to distort the audio.

Accordingly, it is desirable to apply some form of limiting to the receive signal prior to the subsequent amplification (i.e. the external receive gain), in order to minimize the effects of loudspeaker distortion.

Figure 1:
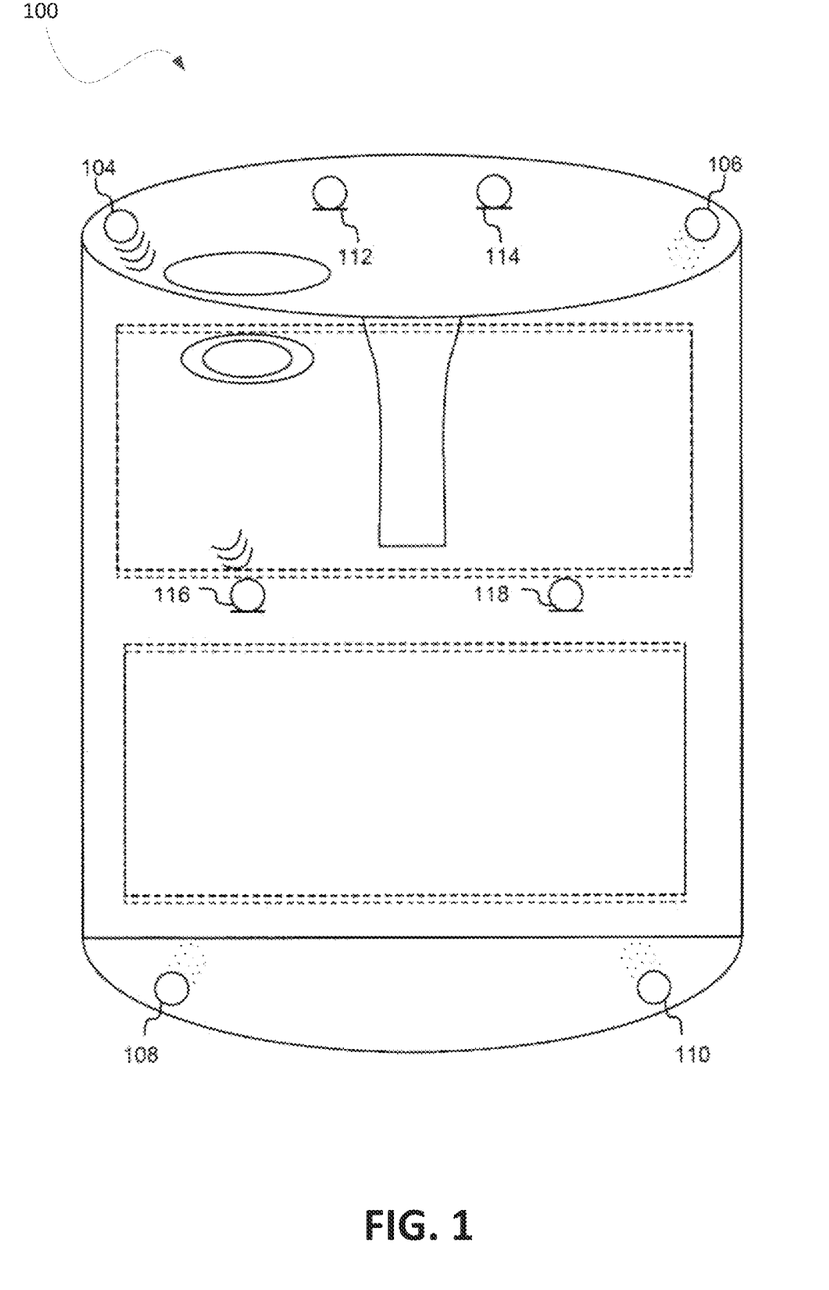
FIG. 1 is a schematic diagram of a vehicle implementing an example hands-free communication system, in accordance with disclosed embodiments.

Reference is first made to FIG. 1, which shows a schematic diagram of a vehicle implementing an example hands-free communication system, in accordance with disclosed embodiments. Audio signals from a far-end are played back through one or more loudspeakers 104-106, and are captured at one or more reference microphones 112-118, as shown in vehicle 100 of FIG. 1.

Figure 2:
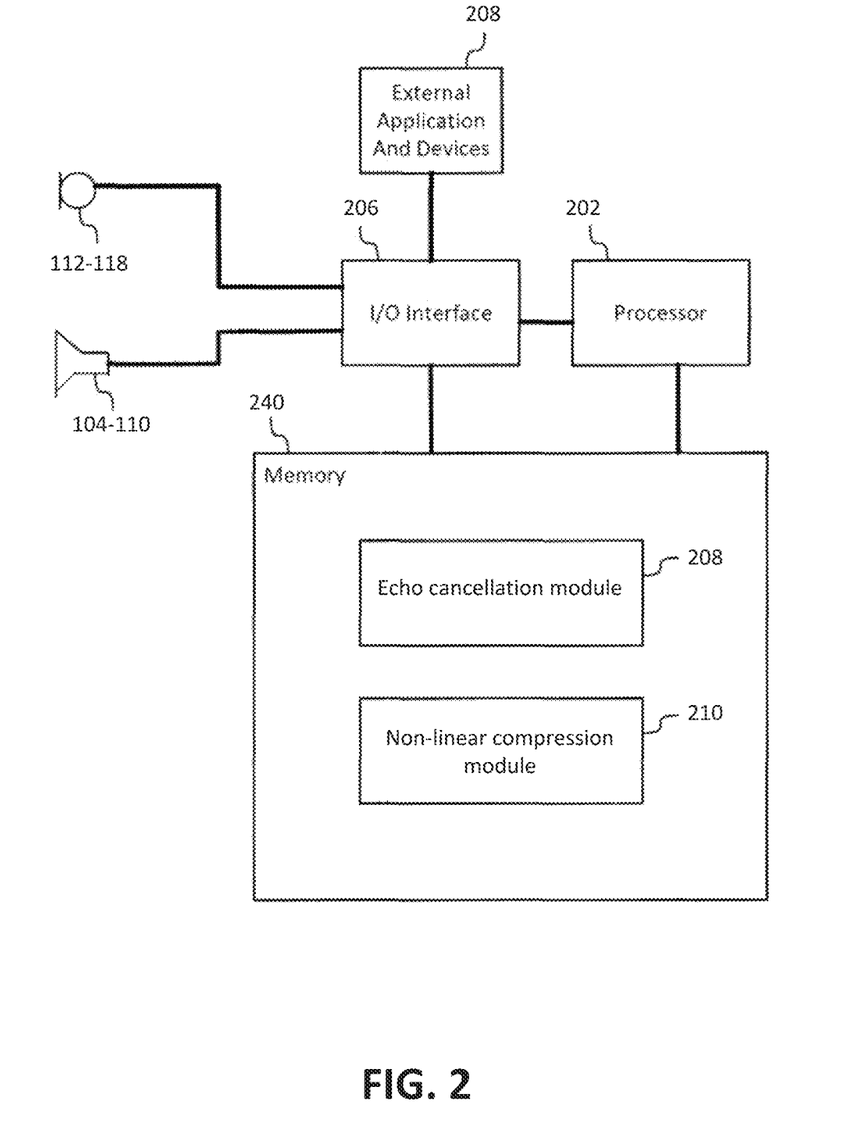
FIG. 2 is a block diagram illustrating components of an in-vehicle hands-free communication system, in accordance with disclosed embodiments.

FIG. 2 shows a block diagram illustrating components of an example hands-free communication system. The system includes, at least, a processor 202, non-transitory media such as a memory 240 (the contents of which are accessible by the processor 202), and an I/O interface 206. The I/O interface 206 connects devices and local and/or remote applications such as, for example, additional microphones, audio transducers or loudspeakers, and acoustic echo canceller and feedback suppression applications. The memory 240 may store instructions which, when executed by the processor 202, causes the system to render various functionalities associated with processing audio signals in the acoustic environment of the vehicle 100, as described herein. In at least some embodiments, the memory 240 may store instructions which, when executed by the processor 202, causes components of the system to perform operations relating to, among others: tuning one or more parameters of a multiband compressor/limiter during downlink processing; computing external receive gains associated with one or more of the loudspeakers; outputting the processed receive signals; collecting and processing near-end speech signals; and acoustic echo cancellation. For example, as illustrated in the example of FIG. 2, the memory 240 may include an echo cancellation module 208 and a non-linear compression module 210 (which may, for example, implement multiband compression/limiting). The tunable parameters for the multiband compressor/limiter may include crossover frequencies, amplitude thresholds, compression ratios, time constants, attack and release times, look-ahead parameters, etc.

The processors 202 may comprise a single processor or multiple processors that may be disposed on a single chip, on multiple devices, or distributed over more than one system. The processors 202 may be hardware that executes computer executable instructions or computer code embodied in the memory 240 or in other memory to perform one or more features of the systems described herein. The processor 202 may include a central processing unit (CPU), a graphics processing unit (GPU), an application specific integrated circuit (ASIC), a digital signal processor (DSP), a field programmable gate array (FPGA), a digital circuit, an analog circuit, a microcontroller, any other type of processor, or any combination thereof.

The memory 240 and/or storage disclosed may retain an ordered listing of executable instructions for implementing the functions described above. The machine-readable medium may selectively be, but not limited to, an electronic, a magnetic, an optical, an electromagnetic, an infrared, or a semiconductor medium. A non-exhaustive list of examples of a machine-readable medium includes: a portable magnetic or optical disk, a volatile memory, such as a Random-Access Memory (RAM), a Read-Only Memory (ROM), an Erasable Programmable Read-Only Memory (EPROM or Flash memory), or a database management system. The memory 240 may comprise a single device or multiple devices that may be disposed on one or more dedicated memory devices or on a processor or other similar device. When functions or steps are said to be "responsive to" or occur "in response to" a function or a process, the device functions or steps necessarily occur as a result of the function or process. Further, when functions indicate an automated echo cancellation occurs, echo is removed by subtracting an estimated echo from the transmitted signal.

The memory 240 may also store non-transitory computer code, executable by processor 202. The computer code may be written in any computer language, such as C, C++, assembly language, channel program code, and/or any combination of computer languages. The memory 240 may store information in data structures including, for example, multiband compressor/limiter tunable parameters, such as crossover frequencies, amplitude thresholds, compression ratios, time constants, attack and release times, look-ahead parameters, etc.

The operations described herein may be executed in response to one or more sets of logic or instructions stored in or on non-transitory computer readable media. In some embodiments, the instructions may be stored on a removable media device for reading by local or remote systems. In some other embodiments, the logic or instructions may be stored in a remote location for transfer through a computer network or over wireless or tangible telephone or communication lines. In yet other embodiments, the logic or instructions may be stored within a given computer such as, for example, a CPU.

Figure 3:
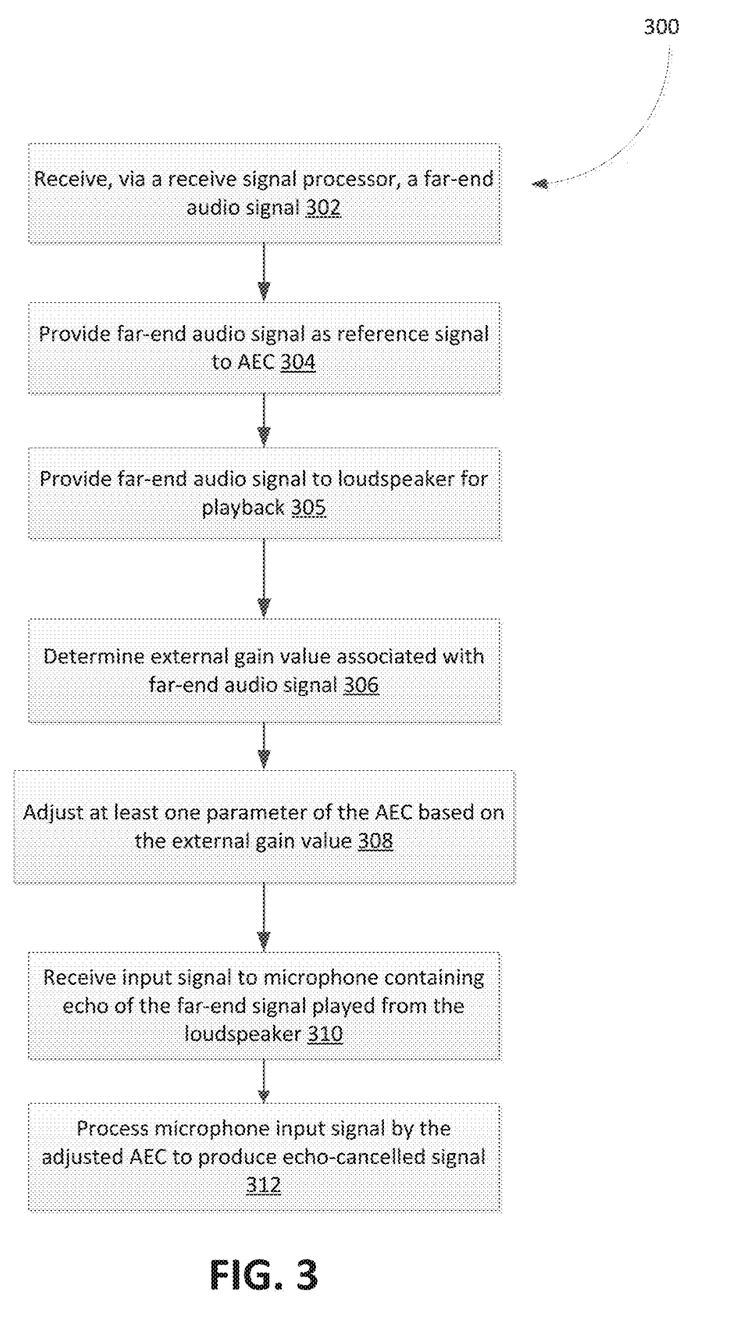
FIG. 3 shows, in flowchart form, an example method for echo cancellation in hands-free communication.
Figure 6:
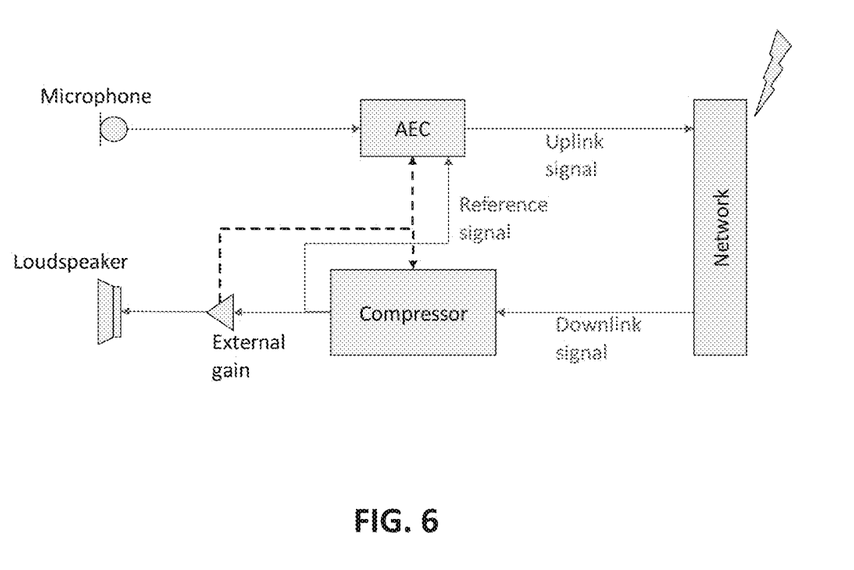
FIG. 6 shows a schematic diagram of an example hands-free communication system.

Reference is made to FIG. 3, which shows in flowchart form, an example method 300 of echo cancellation, and to FIG. 6, which shows a schematic diagram of an example hands-free communication system. The method 300 may be implemented by one or more components of a hands-free communication system. In particular, a processor that is communicably coupled to one or more loudspeakers and microphones in a near-end acoustic environment may be configured to perform some or all of the operations of method 300. The method 300 may apply both to improving echo cancellation for the benefit of a far-end talker as well as reducing distortion from loudspeakers in an acoustic environment to improve voice quality of downlink signal for the benefit of the near-end listener.

In operation 302, the system receives, via a receive signal processor, a far-end audio signal. The far-end audio signal corresponds to an audio signal transmitted from a far-end of a telephony communication. For example, the far-end audio signal may include, among others, a downlink speech signal corresponding to a far-end caller.

In operation 304, the received far-end audio signal is provided as a reference signal to an acoustic echo canceller (AEC) module, such as the echo cancellation module 208 of FIG. 2. The reference signal may, for example, be temporarily stored by the acoustic echo canceller module or other suitable storage that is accessible by the acoustic echo canceller module.

In operation 305, the received far-end audio signal is provided to one or more loudspeakers in the near-end acoustic environment for playback. As explained above, an external receive gain may be applied to the audio signal from the far-end prior to playback from the loudspeakers. High levels of external receive gain may result in distortions being introduced at the playback stage, which can, in turn, violate an acoustic echo canceller's linear assumption and lead to echo leakage.

In order to account for such distortions, the system determines an external gain value associated with the far-end audio signal, in operation 306. That is, the system obtains a value of an external gain that is applied to the far-end audio signal downstream of the receive signal processing and prior to playback from the one or more loudspeakers. In at least some embodiments, determining the external gain value may comprise determining a current external playback volume associated with the loudspeakers. For example, the system may have access to the external volume settings for the loudspeakers, and determine a current playback volume level of the loudspeakers based on the external volume settings.

In some embodiments, the system may not be able to determine the current external playback volume information for the loudspeakers. When the current external volume of the loudspeakers cannot be ascertained, the system may obtain an estimate (or prediction) for the magnitude of the external gain and use this estimate in place of the actual external volume. In particular, the estimate for the magnitude of the external gain may be derived based on input signal to one or more microphones in the acoustic environment and the far-end reference signal. That is, the estimate may be based, at least in part, on playback signal from the loudspeakers that is picked up by the one or more microphones as echo and the far-end reference signal prior to external gain being applied.

For example, the system may use the microphone signal to estimate an average acoustic coupling factor between the reference signal and the signal as it appears at the microphone. This value, also called the average room coupling factor, would be an estimate of how loud the echo signal appears at the microphone. The value may be obtained as a ratio of the power spectrum of the microphone (whilst only the far-end is active) to the power spectrum of the reference signal, with some temporal smoothing, i.e. it is an array across frequency bins. A scalar may be derived from the room coupling array, computed as the average of the room coupling array across the frequency bins. In some cases, additional smoothing operations may be undertaken on the scalar value to ensure minimal variation in the average room coupling, except when there are changes in the acoustic room environment such as when the external playback volume is changed.

If the echo appears strongly at the microphone, it may be inferred, barring any variation in the microphone levels, that the playback volume level is high. As loudspeaker distortion is generally introduced at high playback volumes, the coupling factor may be used in determining when the system should introduce mitigation against distortion. For example, based on the average room coupling factor, the system may determine when to adapt an equalizer to reduce energy in frequencies that are known or predicted to cause distortion in the loudspeakers. As another example, if the average room coupling factor indicates that distortion is likely, the system may temporarily introduce more aggressive non-linear echo suppression on a linear echo-cancellation output of the echo canceller module. This could be limited to a very short time only to cover until simultaneous, if any, modifications made to the received output signal would be seen in the signal picked up at the microphones, obviating the need for more aggressive suppression.

As these mitigation strategies may potentially have undesirable effects, in part due to the inherent feedback between parameters used to affect the output of the echo canceller module and the reference input, it may be advantageous to only apply such strategies when the coupling factor indicates that distortion is likely. In particular, the system may determine that playback distortion in the loudspeakers is likely based on the acoustic coupling factor and in response to such determination, perform one or more of the mitigation operations against loudspeaker distortion. The coupling factor could be extracted from existing calculations made by the echo canceller module. The use of the average room coupling factor to predict distortion may be achieved by calibrating the system during a tuning phase to determine the levels at which distortion is likely to be introduced at the loudspeakers, and to select a suitable mitigation strategy.

In operation 308, the system adjusts at least one parameter of the echo canceller module based on the external gain value determined in operation 306. In some embodiments, an estimate of the coupling factor between the reference signal and the error signal (i.e. output of the linear echo canceller) for the echo canceller module may be adjusted. This coupling factor is a measure of the echo return loss (ERL) associated with the echo canceller module.

In some embodiments, an estimate of the average room coupling factor for the echo canceller module may be adjusted. The average room coupling factor may be obtained as a ratio of the power spectrum of the microphone (whilst only the far-end is active) to the power spectrum of the reference signal, with some temporal smoothing, i.e. it is an array across frequency bins. A scalar is derived from this room coupling array, computed as an average of the room coupling array across the frequency bins.

In operation 310, the playback output of the far-end audio signal from the loudspeakers passes through an acoustic path from the loudspeakers to the microphones and is received as echo in the input signal to one or more of the microphones of the system. This microphone input signal is processed by the adjusted echo canceller module to produce an echo-cancelled signal, in operation 312. That is, the echo canceller module of the system processes the microphone input signal based on its at least one adjusted parameter. The echo-cancelled signal may subsequently be transmitted to a telephony network as an uplink signal.

Figure 4:
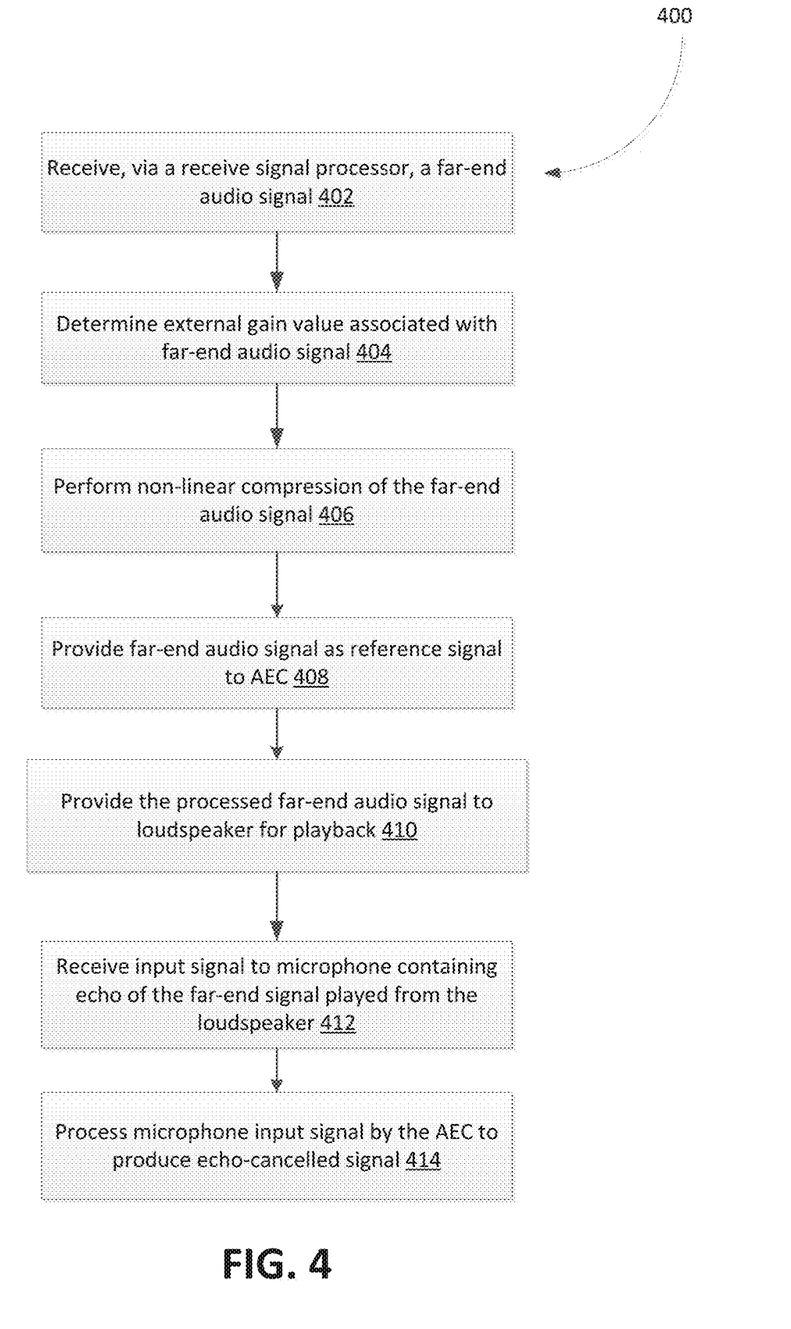
FIG. 4 shows, in flowchart form, another example method for echo cancellation in hands-free communication.

Reference is made to FIG. 4, which shows in flowchart form, an example method 400 of echo cancellation. The method 400 may be implemented by one or more components of a hands-free communication system. In particular, a processor that is communicably coupled to one or more loudspeakers and microphones in a near-end acoustic environment may be configured to perform some or all of the operations of method 400.

The method 300 of FIG. 3 provides an approach for mitigating the effects of loudspeaker distortion by adjusting one or more parameters of an echo canceller module. Another approach is suggested by method 400. According to the latter approach, a receive signal (i.e. far-end audio signal) undergoes some form of limiting during downlink processing based on an anticipated external receive gain for the signal. In particular, to ensure that the system operates in a linear range, non-linear compression may be performed on the signal. For example, a multiband limiter may process the signal, dividing the frequency spectrum of the signal into two or more different sections, or bands, and perform limiting on each band individually. Each band may have its own limiter parameters, such as amplitude thresholds and cross frequencies. The limited bands are then recombined to form the processed output signal.

Limiting involves reducing the volume of the audio signal prior to the subsequent potential amplification downstream to ensure that when the signal contains loud audio, it is limited to prevent it becoming too loud and introducing distortion at playback when large values of the external receive volume are set. Employing a multiband limiter instead of, for example, a single band (full-band) limiter allows for limiting frequencies independently, which minimizes reductions to the dynamic range of the audio signal.

Selecting the parameters used in the limiting operation may require a great degree of tuning which requires considerable expertise and time, and may thus be difficult to justify given the prohibitive costs involved in such a process. Ideally, these tuned parameters would differ in value based on the external playback volume. To reduce these tuning steps, the tuning process and selection of limiting parameters may be performed at a selected external playback volume. If the selected volume is based on the worst-case assumption (i.e. volume is always full), so that the distortion introduced is at its maximum, the resulting amplitude threshold parameter may need to be quite small to ensure that enough limiting is performed on the audio frequencies that are causing the distortion. Applying such an aggressive set of limiter parameters may not be optimal when the external playback volume is significantly reduced, as the limiting will still likely be applied to the reference signal, possibly impacting the quality and dynamic range of the signal heard by the listener in the acoustic environment. Indeed, a subsequent reduction in volume in the received signal downstream may obviate the need for aggressive limiting, as the loudspeaker may likely be operating in a linear range at this reduced volume and echo leakage may no longer be present.

On the other hand, if the external playback volume is based on a nominal (or typical) setting, the distortion is likely to not be present, or minimally present, as the loudspeaker is likely operating in a linear range. The resulting amplitude threshold parameter, for example, may need to be quite large, as very little or no limiting needs to be performed on the audio frequencies that may be causing the distortion. Applying such a relaxed set of limiter parameters may not be optimal when the playback volume is significantly increased, as distortion may be introduced on playback, leading to echo leakage due to a non-functional echo canceller. This case fails to consider a subsequent increase in playback volume in the received signal downstream in the limiter parameter settings used, which is likely to require more aggressive limiting, as the loudspeaker is likely to be operating in a non-linear range and distorting some frequencies.

To address these issues, method 400 provides a technique for computing a non-linear compression (e.g. multiband limiter) of the far-end receive signal and making use of the external playback volume in the receive signal processing to optimize removal of echo artifacts while preserving the dynamic loudness of the receive signal heard by the listener in the acoustic environment.

In operation 402, a far-end audio signal is received, via a receive signal processor. The system then determines, in operation 404, an external gain value associated with the far-end audio signal. In particular, the external gain value may be determined in similar manner as described above in relation to operation 306 of method 300.

In operation 406, a non-linear compression of the far-end audio signal is performed. The receive signal processor may apply non-linear compression of the receive signal prior to playback from the one or more loudspeakers of the acoustic environment.

In at least some embodiments, the non-linear compression is a multiband limiting of the receive signal. A multiband limiter applies varying amounts of limiting in a plurality of different frequency ranges, defined by a crossover frequency and a limiting threshold. This allows for targeting specific frequency ranges that are responsible for loudspeaker distortions while leaving the other frequency ranges unchanged, thereby preserving as much signal content as possible without introducing echo artifacts. An example implementation of a multiband limiter will be described below.

A multiband limiter with N bands will have N−1 crossover frequencies $fx_1, fx_2, \ldots, fx_{(N-1)}$ and thresholds, T, that will be denoted by $T_1, T_2, \ldots, T_N$. The multiband limiter splits the input signal into multiple frequency sub-bands denoted by N, applies limiting to each sub-band independently, and then obtains a full-band time domain signal by combining the individually limited sub-band signals. Each band limiter is tasked with ensuring that the signal at the output of the band limiter is prevented from exceeding the threshold set for that band. In addition to the threshold parameter, other parameters such as various time constants, e.g. attack, release, sustain and look-ahead times, are used to configure a particular band limiter to ensure that the input audio signal, which is scaled by a time-varying external gain, g, to produce an output audio signal, is free from any audible discontinuities which could arise from rapid changes in the external gain, g.

The multiband filters are typically chosen to ensure that summing of the individual filters in each band, results in a 0 dB (i.e. unity) gain at all frequencies, so the crossover behaves like an all-pass filter, having a flat amplitude response with a smoothly changing phase response, which may be of benefit for auditory performance.

The filter magnitude response of sub-band n will be denoted $H_n(f)$. The overall response of the filters used in the multiband limiter (i.e. summing over all sub-bands) is roughly flat, i.e.: $\Sigma_{n=0}^{N-1}(f)=1$ for all frequencies, f The signal, $x_n(t)$ at the output of sub-band n to an input signal, x(t), where t represents discrete time and $h_n(t)$ is the impulse response of sub-band filter n is:

$$x_n(t)=x(t)*h_n(t) \quad (1)$$

where * here denotes a filtering convolution operation.

Let $T_n$ be the limiter threshold for sub-band n, which denotes the desired maximum level of the resulting signal at the output of the individual sub-band limiter. To achieve the limiting, a look-ahead is utilized to compare the absolute value of limiter input signal against this threshold. A limiter gain is computed if the absolute value exceeds the threshold:

$$g_n(t)=T_n/\text{ABS}(x_n(t)) \quad (2)$$

An optimal setting of the band limiter involves adjustments to various time constants and gains to achieve the time-varying limiter gain, g, and desired output behavior.

Let $y_n(t)$ be the output of sub-band n after limiting, which is:

$$y_n(t)=x_n(t) \times g_n(t) \quad (3)$$

and let y(t) be the combined output after summing across all sub-bands:

$$y(t)=\Sigma_{n=0}^{N-1}y_n(t) \text{ for all } t \quad (4)$$

In at least some embodiments, the system may be configured to dynamically adjust settings or parameters of the multiband limiter in order to prevent loudspeaker distortions and echo leakage. For example, where the external playback volume may be determined during downlink processing of the receive signal and prior to playback through the loudspeakers, the volume information may be used in adjusting multiband limiter thresholds.

For a given external receive volume setting, the limiter thresholds may be adjusted based on the difference between the current external receive volume and the receive volume at the time the tuning of the system was performed. If the current external receive volume is greater than the tuning volume, the threshold may be reduced by an adjustable factor, $\Delta T$, proportional to the increase in receive external volume, $\Delta V_{rec}$:

$$\Delta T=k \times \Delta V_{rec} \quad (5)$$

where k is a tuning parameter which decides the degree of adjustment being made to the received output signal considering the current setting of the external receive volume. If k is much less than one, changes to the external receive volume do not result in a significant change to the adjusted output receive signal. However, if k is close to one, the adjusted output receive signal is responsive to changes in the external receive volume.

Such adjustment of the threshold may improve the echo canceller performance at volumes louder than the tuning volume. If, on the other hand, the receive volume is less than the tuning volume, the limiter threshold may be increased by an adjustable factor proportional to the decrease in volume, which may maintain the echo canceller performance while reducing the undesired range compression effects of the received output signal.

In some cases, rather than adjusting a limiter threshold, T, an alternative may be to keep the limiter threshold fixed and adjusting the absolute value of the limiter input signal by the $\Delta T$ factor as follows:

$$\text{ABS}(z_z(t))=\Delta T \times \text{ABS}(x_n(t)) \quad (6)$$

and comparing, $\text{ABS}(z_n(t))$, against the threshold T in equation (2) in determining the limiter gain value.

The system provides the reference signal, which is the output of the non-linear compressor, to an acoustic echo canceller module, in operation 408. In operation 410, the system provides the processed far-end audio signal to the loudspeakers for playback. Upon receiving input to the microphones containing echo of the processed far-end audio signal in operation 412, the system processes the microphone input signal, via the echo canceller module, to produce an echo-cancelled signal for transmission to the far-end in operation 414.

In some embodiments, the limiter settings/parameters may be dynamically changed based on estimates of the variable external gain. For example, when external receive volume information is not available or accessible by the system, an estimate of the external gain may be derived, in similar manner as described in relation to operation 306 of method 300. If the estimate indicates that loudspeaker distortion is likely, various strategies for mitigating the distortion, such as multiband limiting in receive signal processing, may be employed. For example, the estimate may be based on an average coupling factor between the reference signal and the signal as it appears at the microphone(s). The band limiter settings may be adjusted based on changes in the estimate for the external gain value.

Figure 5:
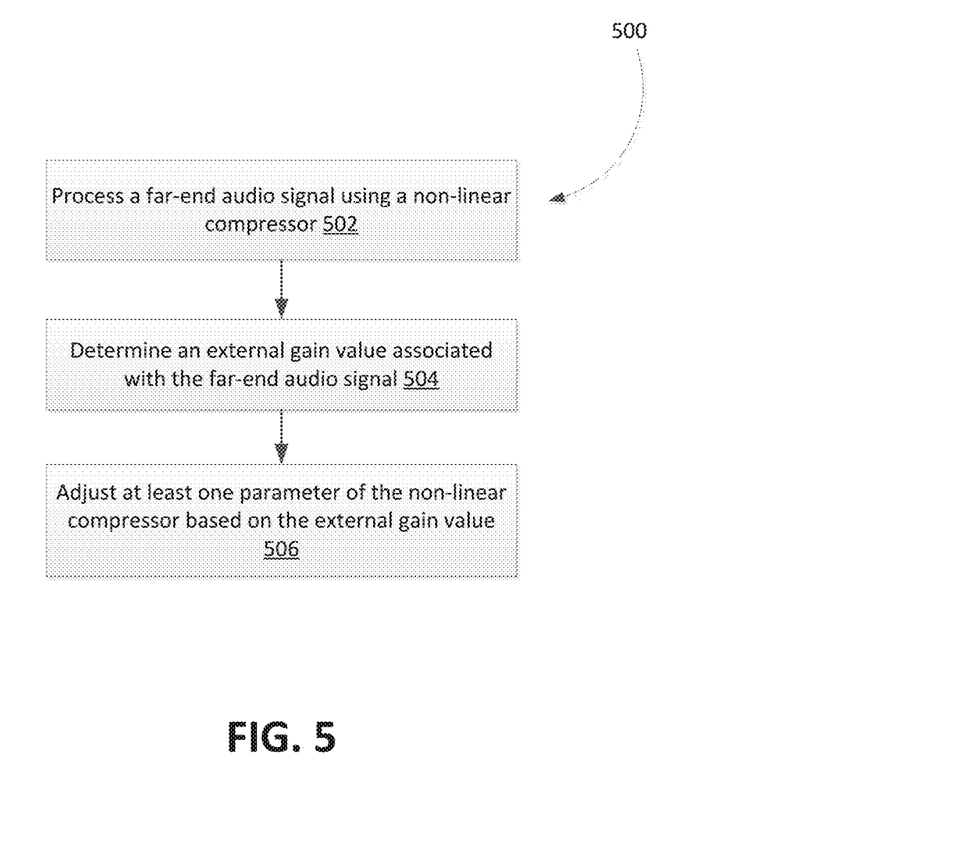
FIG. 5 shows, in flowchart form, an example method for tuning a non-linear compressor.

Reference is made to FIG. 5, which shows in flowchart form, an example method 500 of tuning a non-linear compressor. The method 500 may be implemented by a system for minimizing distortions which may be introduced by loudspeakers of a hands-free communication system. In particular, a processor that is communicably coupled to one or more loudspeakers and microphones in a near-end acoustic environment may be configured to perform some of all of the operations of method 500.

In operation 502, the system receives a far-end audio signal via a receive signal processor. The system determines an external gain value associated with the far-end audio signal, in operation 504. The external gain value may, in some embodiments, be a known value of an external playback volume of the loudspeakers. Alternatively, the determined external gain value may be an estimate of a variable gain that is applied to the signal downstream of the receive processing.

In operation 506, the system adjusts at least one parameter of the non-linear compressor based on the determined external gain value. For example, one or more parameters such as crossover frequencies, amplitude thresholds, compression ratios, time constants, attack and release times, and look-ahead parameters may be varied dynamically based on the external gain value. In operation 508, the system processes the far-end audio signal using the adjusted at least one parameter of the non-linear compressor.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A method of echo cancellation in hands-free communication, the method comprising:
    receiving, via a receive signal processor, a far-end audio signal;
    providing the far-end audio signal to:
        an acoustic echo canceller module as a reference signal, and
        at least one loudspeaker for playback;
    determining an external gain value associated with the far-end audio signal, the external gain applied to the far-end audio signal downstream of the receive signal processor and prior to playback from the at least one loudspeaker, wherein determining the external gain value includes determining a current external playback volume associated with the at least one loudspeaker;
    performing, by the receive signal processor, a multiband limiting of the far-end audio signal prior to playback from the at least one loudspeaker, wherein performing the multiband limiting comprises dividing a frequency spectrum of the far-end audio signal into a plurality of frequency bands and performing limiting on each frequency band individually;
    adjusting at least one parameter of the acoustic echo canceller module based on the current external playback volume;
    receiving an input signal to a microphone containing echo of the far-end signal played from the at least one loudspeaker; and
    processing the microphone input signal by the adjusted acoustic echo canceller module to produce an echo-cancelled signal.

2. The method of claim 1, further comprising adjusting the at least one parameter associated with the multiband limiting including adjusting a limiter threshold for at least one of the plurality of frequency bands, the limiter threshold being associated with a predetermined tuning volume, and wherein a change in a limiter threshold for the at least one frequency band is proportional to a change in volume from the tuning volume to the current external playback volume.

3. The method of claim 1, wherein adjusting the at least one parameter of the acoustic echo canceller module comprises adjusting an echo return loss (ERL) associated with the acoustic echo canceller module.

4. The method of claim 1, wherein determining the external gain value comprises obtaining an estimate for the magnitude of the external gain based on the microphone input signal.

5. The method of claim 4, wherein obtaining the estimate for the magnitude of the external gain comprises obtaining an acoustic coupling factor representing a ratio of a power spectrum of the microphone to a power spectrum of the far-end audio signal.

6. The method of claim 1, further comprising:
    determining that playback distortion of the at least one loudspeaker is likely based on the acoustic coupling factor; and
    in response to determining that playback distortion of the at least one loudspeaker is likely, performing, by the receive signal processor, a non-linear compression of the far-end audio signal.

7. The method of claim 1, further comprising:
    determining that playback distortion of the at least one loudspeaker is likely based on the acoustic coupling factor; and
    in response to determining that playback distortion of the at least one loudspeaker is likely, performing non-linear suppression on a linear echo-cancellation output of the echo canceller module.

8. A system for cancelling echo in hands-free communication, the system comprising:
    a loudspeaker; and
    a processor configured to:
        receive a far-end audio signal;
        provide the far-end audio signal to:
            an acoustic echo canceller module as a reference signal, and
            the loudspeaker for playback;
        determine an external gain value associated with the far-end audio signal, the external gain applied to the far-end audio signal downstream of a receive signal processor and prior to playback from the at least one loudspeaker, wherein determining the external gain value includes determining a current external playback volume associated with the at least one loudspeaker;

perform, by the receive signal processor, a multiband limiting of the far-end audio signal prior to playback from the at least one loudspeaker, wherein performing the multiband limiting comprises dividing a frequency spectrum of the far-end audio signal into a plurality of frequency bands and performing limiting on each frequency band individually;

adjust at least one parameter of the acoustic echo canceller module based on the external gain value;

receive an input signal to a microphone containing echo of the far-end signal played from the at least one loudspeaker; and process the microphone input signal by the adjusted acoustic echo canceller module to produce an echo-cancelled signal.

9. The system of claim 8, wherein the processor is further configured to adjust at least one parameter associated with the multiband limiting including adjusting a limiter threshold for at least one of the plurality of frequency bands, the limiter threshold being associated with a predetermined tuning volume, and wherein a change in a limiter threshold for the at least one frequency band is proportional to a change in volume from the tuning volume to the current external playback volume.

10. The system of claim 8, wherein adjusting the at least one parameter of the acoustic echo canceller module comprises adjusting an echo return loss (ERL) associated with the acoustic echo canceller module.

11. The system of claim 8, wherein determining the external gain value comprises obtaining an estimate for the magnitude of the external gain based on the microphone input signal.

12. The system of claim 11, wherein obtaining the estimate for the magnitude of the external gain comprises obtaining an acoustic coupling factor representing a ratio of a power spectrum of the microphone to a power spectrum of the far-end audio signal.

13. The system of claim 8, wherein the processor is further configured to:
determine that playback distortion of the at least one loudspeaker is likely based on the acoustic coupling factor; and
in response to determining that playback distortion of the at least one loudspeaker is likely, perform, by the receive signal processor, a non-linear compression of the far-end audio signal.

14. The system of claim 8, wherein the processor is further configured to:
determine that playback distortion of the at least one loudspeaker is likely based on the acoustic coupling factor; and
in response to determining that playback distortion of the at least one loudspeaker is likely, perform non-linear suppression on a linear echo-cancellation output of the echo canceller module.

15. A non-transitory, computer readable medium storing instructions which, when executed by a processor, cause the processor to:
receive a far-end audio signal;
provide the far-end audio signal to:
an acoustic echo canceller module as a reference signal, and
at least one loudspeaker for playback;
determine an external gain value associated with the far-end audio signal, the external gain applied to the far-end audio signal downstream of a receive signal processor and prior to playback from the at least one loudspeaker, wherein determining the external gain value includes determining a current external playback volume associated with the at least one loudspeaker;
perform, by the receive signal processor, a multiband limiting of the far-end audio signal prior to playback from the at least one loudspeaker, wherein performing the multiband limiting comprises dividing a frequency spectrum of the far-end audio signal into a plurality of frequency bands and performing limiting on each frequency band individually;
adjust at least one parameter of the acoustic echo canceller module based on the external gain value;
receive an input signal to a microphone containing echo of the far-end signal played from the at least one loudspeaker; and
process the microphone input signal by the adjusted acoustic echo canceller module to produce an echo-cancelled signal.

16. A method of tuning a non-linear compressor that minimizes loudspeaker distortion, the method comprising:
receiving, via a receive signal processor, a far-end audio signal;
determining an external gain value associated with the far-end audio signal, the external gain applied to the far-end audio signal downstream of the receive signal processor via the non-linear compressor and prior to playback from the loudspeaker;
adjusting at least one parameter of the non-linear compressor based on the external gain value; and
processing, via the receive signal processor, the far-end audio signal using the adjusted at least one parameter of the non-linear compressor.

* * * * *